T. H., J. E., J. F. & R. J. Wilson,

Horse Power.

Nº 20,461.    Patented June 1, 1858.

UNITED STATES PATENT OFFICE.

T. H. WILSON, J. E. WILSON, J. F. WILSON, AND R. J. WILSON, OF ATHENS, GEORGIA.

HORSE-POWER.

Specification of Letters Patent No. 20,461, dated June 1, 1858.

*To all whom it may concern:*

Be it known that we, T. H. WILSON, J. E. WILSON, J. F. WILSON, and R. J. WILSON, of Athens, in the county of Clark and State of Georgia, have invented a new and Improved Horse-Power; and we do hereby declare that the following is a full, clear, and exact description of the same, reference being had to the annexed drawings, making a part of this specification, in which—

Figure 1:
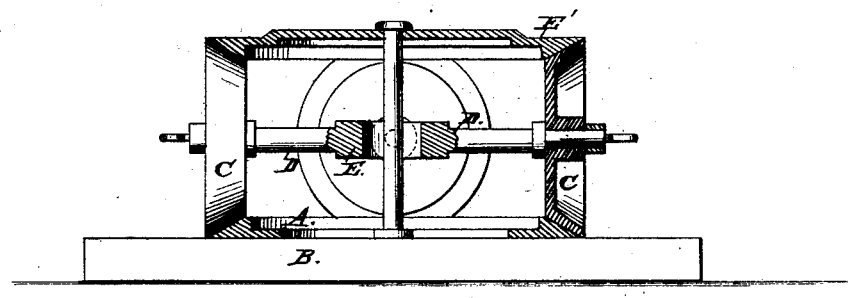
Figure 2:
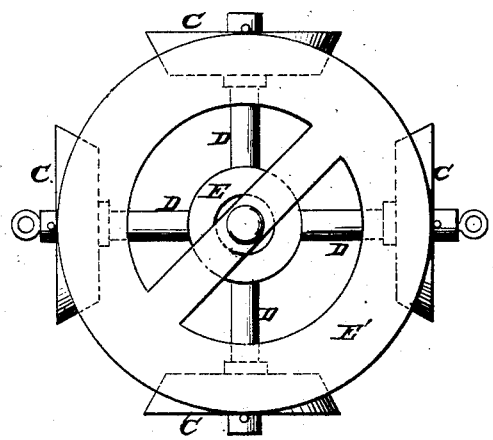

Figure 1, is a side sectional view of our improvement; and Fig. 2, a plan or top view of the same.

Similar letters of reference indicate corresponding parts in the two figures.

Our invention consists in having a series of driving wheels fitted on an annular tread or way and attached to radius axles connected at their inner ends, a wheel, from which the power is taken, being fitted on the driving wheels, the latter wheels rotating the former one with an increased speed, due to their combined forward and rotating movements.

To enable those skilled in the art to fully understand and construct our invention, we will proceed to describe it.

A, represents an annular horizontal tread or way properly secured on the ground or on a proper flooring or platform, B. This tread or way is beveled transversely, as shown clearly in Fig. 1, and upon it four wheels, C, are placed, said wheels having their treads beveled to coincide with the tread or way A. The wheels C, are placed on the ends of axles D, D, which cross each other at right angles, or the axles may be described as being radial and connected to, or projecting from, an annular hub or boss, E. On the wheels C, a wheel $E^1$ is placed, said wheel being of beveled form transversely on its under side, corresponding to the bevel of the wheels C; see Fig. 1.

The horses or other animals are attached to the ends of the axles D,—one or more animals being used,—and as the wheels C are drawn around, the wheel $E^1$ will be rotated by two different movements of wheels C, one being the bodily rotation caused by the draft applied to the wheels C, this motion being of course equal to that of the wheels C, that is to say, the wheel $E^1$ would be rotated once while the wheels C are drawn once around the way or tread A, provided the wheels C did not rotate on the axles D; but as the wheels C do rotate, this movement must also be added to that formerly mentioned; and if the wheels C, be half the diameter of wheel $E^1$, as represented in the drawings,—the tread or way A and wheel $E^1$, being equal—it follows, as a matter of course, that the wheels C will be rotated twice in passing around the tread or way, and this movement of the wheels is equal to one revolution of wheel $E^1$; consequently at every revolution of the animal around its walk and of the wheels C on the tread or way A, two revolutions will be given the wheel $E^1$. The power is to be taken from the wheel $E^1$, and the peripheries of the wheels may be smooth—friction being depended upon for rotation; or the wheels may be cogged or toothed. The latter mode of construction would probably be preferable in large machines.

The relative size of the wheels C, and wheel $E^1$, may be proportioned as desired, so that the relative speed of the wheels C and $E^1$ may be regulated as occasion may require.

By this improvement a very portable horse power is obtained and also a very simple one, for the speed is multiplied by a very few parts, and consequently not much power is consumed or lost by friction. The machine also may be cheaply constructed and its parts readily detached and put together, so that the machine may be easily conveyed from place to place.

Having thus described our invention, what we claim as new, and desire to secure by Letters-Patent, is:

The annular tread or way A, wheels C, any proper number being used, and attached to axles D, and the wheel $E^1$; the whole being arranged to operate as and for the purpose herein set forth.

THOS. H. WILSON.
JOHN E. WILSON.
JAS. F. WILSON.
R. J. WILSON.

Witnesses:
JOHN KIRKPATRICK,
E. L. NEWTON.